United States Patent [19]

Gard et al.

[11] Patent Number: 4,692,909
[45] Date of Patent: Sep. 8, 1987

[54] ADAPTIVE SEISMIC SIGNAL PROCESSOR

[75] Inventors: Michael F. Gard, Catoosa, Okla.; Ralph E. Warmack, Kingwood, Tex.; Kyong H. Lee, Albuquerque; Robert H. Maschhoff, Cedar Crest, both of N. Mex.

[73] Assignee: Amoco Corporation, Chicago, Ill.

[21] Appl. No.: 626,491

[22] Filed: Jun. 29, 1984

[51] Int. Cl.$^4$ .......................... G01V 1/22; G01V 1/36
[52] U.S. Cl. ........................................ 367/45; 367/49; 364/421
[58] Field of Search ...................... 367/43, 45, 49, 63; 381/31; 375/34; 340/347 AD, 347 DD; 364/724, 421; 370/84, 118

[56] References Cited

U.S. PATENT DOCUMENTS

| | | | |
|---|---|---|---|
| 3,997,772 | 12/1976 | Crochiere | 364/718 |
| 4,216,354 | 8/1980 | Esteban et al. | 381/31 |
| 4,314,364 | 2/1982 | Beckel | 367/49 |
| 4,362,909 | 12/1982 | Snijders et al. | 179/170.2 |
| 4,386,430 | 5/1983 | Treiber | 364/724 |
| 4,472,785 | 9/1984 | Kasuga | 364/718 |
| 4,479,213 | 10/1984 | Galand et al. | 370/118 |
| 4,509,037 | 4/1985 | Harris | 375/28 |
| 4,509,150 | 4/1985 | Davis | 367/76 |
| 4,556,962 | 12/1985 | Widrow | 367/45 |

Primary Examiner—Nelson Moskowitz
Attorney, Agent, or Firm—Timothy D. Stanley

[57] ABSTRACT

In portable seismic data acquisition units, an adaptive seismic signal processor and method for resampling and bandpassing selected frequencies of an input digital signal. The adaptive seismic signal processor and method provide an output digital signal having a frequency domain and resampling rate which can be selected from one of a plurality of predetermined frequency domains and sampling rates during the course of acquisition of the input digital signal without substantial loss or deterioration thereof.

9 Claims, 7 Drawing Figures

ADAPTIVE SEISMIC SIGNAL PROCESSOR

BACKGROUND OF THE INVENTION

The field of the present invention relates generally to geophysical exploration utilizing seismic techniques. More particularly, this invention provides a method and apparatus for adaptive processing of seismic signals during the course of acquisition of seismic data.

Seismic exploration involves imparting seismic wave energy into the earth's formations with a seismic source. Typical of such seismic sources are explosive charges and mechanical seismic wave generators. The seismic wave energy is reflected and/or refracted due to differences in acoustic impedance of adjacent subsurface formations. Seismic wave energy detectors, i.e. seismometers, spaced about the surface of the earth develop electric analog signals in response to the reflected and/or refracted seismic wave energy.

The analog signals are collected at seismic data acquisition units such as described in Broding, et al., U.S. Pat. No. 3,806,864. The Broding seismic data acquisition units amplify, filter and digitize the analog signals such that they can be processed by a digital computing unit to produce a seismic trace. The seismic trace is a geophysical representation of the processed digital signals which permits seismologists to interpret and analyze the earth's subterranean formations.

Heretofore, seismic data acquisition units filtered the analog signal to eliminate selected frequencies which were not developed in the seismic process, e.g., 60 Hz noise from electric transmission lines, as well as to preclude the generation of alias frequencies in the subsequent digitization process. The generation of alias frequencies in the digitization process is the result of sampling the analog signal at a rate less than two samples per cycle of the highest frequency in the analog signal. J. A. Coffeen in "Seismic Exploration Fundamentals," Penn-Well Publishing Co (1978), page 87, notes that alias frequencies can be precluded by utilizing an anti-alias filter which is impressed on the analog signal to eliminate high frequencies which can generate alias frequencies depending upon the sampling rate utilized in the analog to digital conversion.

It is oftentimes desirable to resample the digitized analog signal, i.e., the digital signal. Presently, varying resampling rate of the digital signal occurs either after the acquisition period on a central processing unit or before the acquisition period by modifying the data acquisition unit. Resampling the digital signal, i.e., increasing the sample interval, has the effect of decreasing the volume of seismic data which are acquired. As such, resampling can be utilized as a method for effectively prolonging the operational period of utility for a portable seismic data acquisition unit before its seismic data storage capacity is exceeded. However, resampling the digital signal requires an anti-alias filter, adaptive to each resampling rate, be provided to preclude the generation of alias frequencies. Heretofore, a significant limitation in providing multiple resampling rates in a portable seismic data acquisition unit has been the inability to cooperatively couple the resample rate and the frequency domain of the anti-alias filter such that the resampling rate can be varied during the course of acquiring the seismic data without nonlinear phase response thereof.

Portable seismic data acquisition units, such as disclosed in Broding, et al., have been limited to the utilization of analog filters. The analog filters are high order Butterworth or high order Cauer type. Such filters suffer from both fundamental and practical limitations which compromise their usefulness for adaptive low pass frequency filtrating. Fundamentally, such analog filters have a nonlinear phase response characteristic in the passband which is evidenced as a differential time delay for frequency components of the analog signal. Conversely, sufficiently sharp frequency cutoff characteristics are not available with linear phase response analog filters of any practical order. Practically, component tolerances and nonideal behavior in realizable components make it difficult to construct an analog filter which has unit-to-unit repeatability because temperature effects cause the amplitude and phase characteristics of such analog filters to drift, resulting in a change in filter characteristics with temperature; fine adjustment of frequency characteristics is made difficult by complex interaction between components; high order analog filters have high component counts requiring substantial circuit board area; precision frequency characteristics require components which have close tolerances, high cost and may require hand selection; and relatively high power consumption which can be a considerable limitation in battery operated, portable seismic data acquisition units.

While most analog filters are limited to fixed passband frequency domains, this fact poses no limitation on the use of analog filters strictly as an anti-alias filter in conjunction with an analog to digital converter having a fixed sampling rate. However, if an anti-alias filter having bandpass frequency domains cooperatively coupled to a plurality of resampling rates is desired, the resulting analog filter design is very cumbersome and further exacerbates the problems of design fixed passband frequency domain analog filters previously noted.

Various digitally controlled analog filters have been proposed to provide multiple bandpass frequency domains for portable data acquisition units. A first approach has been to build a plurality of physically distinct analog filters, each with a specific bandpass frequency domain and select the appropriate analog filter with a solid state switch activated by a digital code. The disadvantages of this approach are the amount of power and circuit board area required, as well as the difficulty in selecting components and tuning the individual analog filters.

A second approach is to provide multiple integrated circuit switches for switching a multiplicity of passive devices in a basic analog design. In such a circuit, all the necessary capacitors or resistors and operational amplifiers would be fixed, and independent sets of resistors or capacitors corresponding to different frequency characteristics could be present on the board. A digital code would then select one of the available resistor or capacitor network sets to provide the desired bandpass frequency domain. Although superior to using multiple independent analog filters, there are still significant manufacturing problems necessitated by the care in selecting components and tuning the analog filter. A significant disadvantage in any realizable semiconductor circuit switch is its channel impedance which is variable with temperature. As such, temperature-related changes upon the resistance of the switching element upsets the critical relationship between component values which determine the frequency response of the analog filter.

A third approach is essentially the same as the second with the exception that miniature latching relays are used in place of the integrated circuit switching elements to provide a frequency selection. While this approach reduces switch impedance to negligible levels, all of the problems of component selection and analog filter tuning remain. Reliability is decreased since the relay mechanisms are relatively delicate and the shock and vibration requirements for its intended use with portable data acquisition units contraindicate the use of electromechanical devices of any sort.

Moreover, with any analog-type filter, it is virtually impossible to change the bandpass frequency domain during the acquisition of data without using a separate filter for each desired frequency domain. If multiple filters are used, all filters would have to be active at all times to respond immediately to a change in filter selection. If a single switched-component filter configuration were implemented, it would not be possible to change the frequency response in the single analog filter during acquisition without sacrificing several data samples because the bandwidth is finite and the slew rate is limited. Therefore a sudden change in the frequency domain would have a finite settling time distorting several samples following such a change. As such, providing portable data acquisition units with a multiplicity of selectable resampling rates without the loss or distortion of the data when changing resampling rates has not been practicable.

SUMMARY OF THE INVENTION

A method and apparatus are disclosed for adaptive processing of an input digital signal in a portable seismic data acquisition unit.

In accordance with the present invention, an apparatus and method are provided for resampling a digital seismic signal during the course of seismic data acquisition such that the resampling rate is cooperatively coupled to frequency domains of a digital filter to preclude the generation of alias frequencies. Moreover, such apparatus and method can be implemented without phase distortion of the seismic signal while changing the resampling rate during the course of acquisition of such seismic data.

The adaptive seismic signal processor of the present invention includes filter means for bandpassing a plurality of predetermined frequency domains of an input digital signal. The adaptive seismic signal processor also includes decimation means for resampling the filtered digital signal at one of a plurality of predetermined resampling rates. Coupling means are provided to cooperatively couple each predetermined frequency domain of the filter means with one of the plurality of predetermined resampling rates of the decimation means. The adaptive seismic signal processor fruther includes selector means for selecting one of the plurality of resampling rates during the course of acquiring the input digital signal.

The adaptive seismic signal processor of the present invention can be realized in either of two embodiments. In a first embodiment, at least two digital filter units are connected in cascade, each digital filter unit is adapted to bandpass predetermined frequency domains of the input digital signal. Each digital filter unit has linear phase response. The filtered digital signal of each digital filter unit is resampled at a rate prescribed by a decimation unit. The rate of resampling is cooperatively coupled to each predetermined frequency domain so as to preclude generating alias frequencies. A selector provides for selecting one of a plurality of resampling rates during the course of acquisition of the input digital signal without substantial loss or deterioration thereof.

In a preferred configuration of the first embodiment, the digital filter units are finite impulse response (FIR) filters. Since the FIR filters are connected in cascade, the output filtered digital signal of each FIR filter unit is input digital signal to each subsequent FIR filter unit although the output filtered digital signal of any FIR filter unit can be passed as the final output digital signal. The frequency domain of each FIR filter unit is an octave step lower than the preceding FIR filter unit.

A second embodiment of the present invention comprises a single FIR filter unit adapted to pass one of a plurality of predetermined frequency domains. The filtered digital signal is resampled by a decimation unit having a plurality of predetermined resampling rates. Each predetermined frequency domain is cooperatively coupled with one of the plurality of predetermined resampling rates to preclude the generation of alias frequencies. A selector can select one of the plurality of the resampling rates of the decimation unit and the cooperatively coupled frequency domain of the filter unit during the course of acquiring the input digital signal.

The adaptive seismic signal processor of the present invention thus uniquely defines an apparatus for cooperatively coupling frequency domains of the filter unit and the resampling rate of the decimation unit thereof such that the resampling rate can be varied in field portable seismic data acquisition units.

Resampling the filtered digital signal also increases the signal-to-noise ratio of the final output digital signal. The digital filtering of the digitized input analog signal overcomes the problems associated with previous attempts to provide selective filtering and resampling of the input digital signal as previously discussed. Additionally, the unique design of the present adaptive seismic signal processor consumes very little power and requires less board space than previous analog filters. Both results make the adaptive seismic signal processor of the present invention uniquely adapted for use in portable seismic data acquisition units.

The capability of selecting from a set of predetermined resampling rates is enhanced when the seismic data acquisition unit of the present invention is utilized in conjunction with a remote field control unit. Operationally, the remote field control unit provides the capability of remotely selecting resampling rate heretofore unobtainable with analog filters because varying the resampling rate required cooperatively varying the frequency domain of the analog filters.

Moreover, varying the bandpass frequency domains of an analog filter in a portable seismic data acquisition unit required a hardware change. However, even after the adaptive seismic signal processor of the present invention has been prepared to bandpass a set predetermined frequency domains, changes in the sets of frequency domains can be made without a hardware change.

The desirability of using an all digital filter in conjunction with portable seismic data acquisition units is derived principally from the inherent accuracy, reprducibility, and predictability of such filters. Digital filters exhibit essentially no unit-to-unit variation because the accuracy of the cutoff frequency is determined by a clock frequency and not by component tolerances. As such, reproducibility of better than 0.005% can be realized over the operating temperature range of a portable seismic data acquisition unit. Moreover, by implementing a digital filter in CMOS technology, the power consumption can be reduced to a minimum.

DESCRIPTION OF THE DRAWINGS

FIG. 3B also demonstrates how a finite number of filter coefficients are selected.

DETAILED DESCRIPTION OF THE PREFERRED EMBODIMENT

The adaptive seismic signal processor of the present invention is generally designated by the letter A. The adaptive seismic signal processor A is adapted to bandpass one of a plurality of frequency domains of an input digital signal and thereafter to resample the filtered digital signal. In particular, the adaptive seismic signal processor A provides the unique capability of varying the resampling rate without generating alias frequencies in portable seismic data acquisition units of the type described by Broding, et al., in U.S. Pat. No. 3,806,864. The Broding seismic data acquisition unit is merely exemplary of the field of use, and nothing contained herein precludes the application of the adaptive seismic signal processor A in other types of portable seismic data acquisition units.

Figure 1:
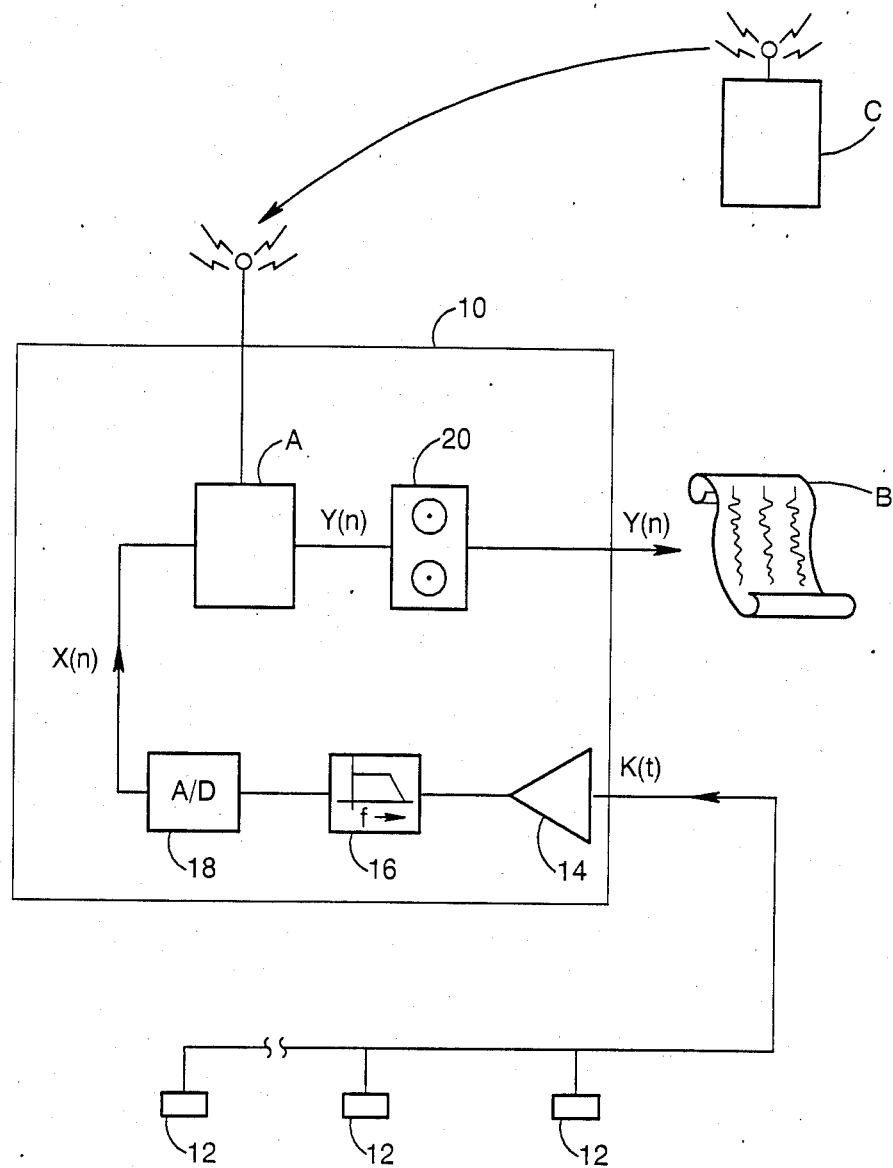
FIG. 1 is a schematic representation of a portable data acquisition unit having the adaptive filtration system of the present invention.

Looking first to FIG. 1, a portable seismic data acquisition unit 10 is shown schematically deployed in the field. The data acquisition unit 10 is adapted to receive an analog input signal K(t) from an array of geophones 12. The seismic data acquisition unit 10 includes a signal conditioner 14 for amplifying the filtering the analog input signal K(t); a low pass analog anti-alias filter 16 to pass only selected frequencies of the analog input signal K(t) to preclude the generation of alias frequencies during the analog to digital conversion by an analog to digital converter 18. The adaptive seismic signal processor A filters and resamples the digital signal X(n). A command signal transmitted from a field control unit C to the data acquisition unit 10 communicates a specified resampling rate to the adaptive seismic signal processor A such that the digital signal X(n) is cooperatively resampled and filtered so as to preclude the generation of alias frequencies due to resampling in the final output digital signal Y(n).

The adaptive seismic signal processor A, in response to the command signal from the field control unit C, is adapted to cooperatively select from a plurality of predetermined resampling rates and frequency domains a resampling rate and a frequency domain having as its upper bound the Nyquist frequency. The resampling rate can be varied during the acquisition of the input digital signal without substantial loss or phase distortion thereof. The filtered and resampled final output digital signal Y(n) can then be stored in memory unit 20 for subsequent transmittal to a central station to be recorded for ultimate processing to generate a seismic trace B.

The adaptive seismic signal processor A of the present invention includes a digital filter unlike the analog filters previously described and heretofore used in portable seismic data acquisition units. Until recently, digital filters have been generally unable to compete with analog filters in a variety of applications and particularly in portable seismic data acquisition units. Although digital filters are frequently discussed in terms of their analog counterparts, it should be noted that digital filters are capable of functional performances that analog filters can only approach and then only by extreme complexity. Even though a digital filter may be constructed to emulate an analog equivalent, it is important to remember that analog filters and digital filters are distinctly different conceptually.

Presently, three major types of digital filters are identified in the art. They are finite impulse response (FIR), finite impulse response (IIR) and lattice filters. In the preferred embodiment of the adaptive seismic signal processor A, FIR type filters are utilized. As such, a brief description of the operation of a general canonical form of the FIR filter shown in FIG. 2 is provided.

Figure 2:
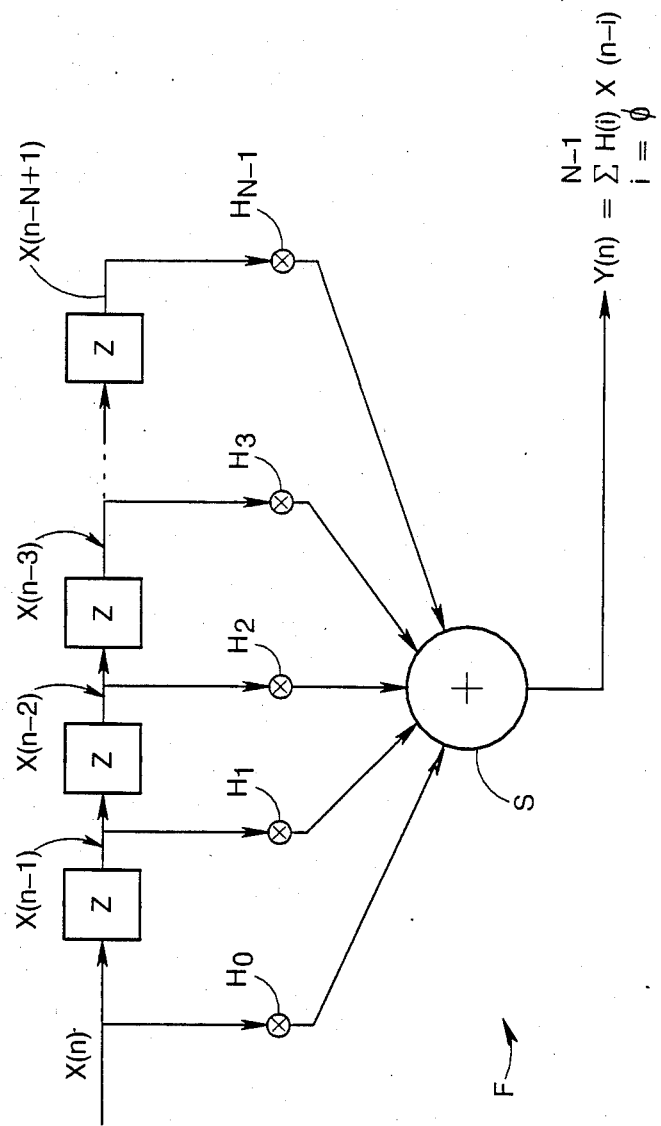
FIG. 2 is a schematic representation of a general canonical form of a FIR filter.

The FIR filter F shown in FIG. 2, receives a time series input digital signal X(n) into a series of delay registers Z, each of which can be regarded as a shift register or memory address. At each delay register Z, the input digital signal X(n) is multiplied by a predetermined coefficient $H_0, H_1, \ldots, H_{N-1}$. How such coefficients are determined will be discussed later. As the time series input digital signal X(n) proceeds through the delay registers Z, a summation is made of the product of the coefficients $H_0, H_1, \ldots, H_{N-1}$, and the time series input digital signal X(n) by a summation unit S. The output digital signal Y(n) of the FIR filter F is computed from a present input digital signal X(n) and the preceding (N−1) input digital signals X(n) by an appropriate coefficient H(i) (where i=0 to N−1) and summing the resulting products. More exactly, the output digital signal Y(n) is:

$$Y(n) = \sum_{i=0}^{N-1} H(i) X(n - i)$$

The length of the FIR filter F is N and H(i) is the ith filter coefficient or a numerical value corresponding to the value of the impulse response at the ith time interval of the filter time response.

A distinguishing characteristic of the FIR filter F from the other digital filters is that it is nonrecursive, i.e., the output digital signal Y(n) is determined only by the coefficients, $H_0, H_1, \ldots, H_{N-1}$, and a finite number N of input samples X(n).

Figure 3B:
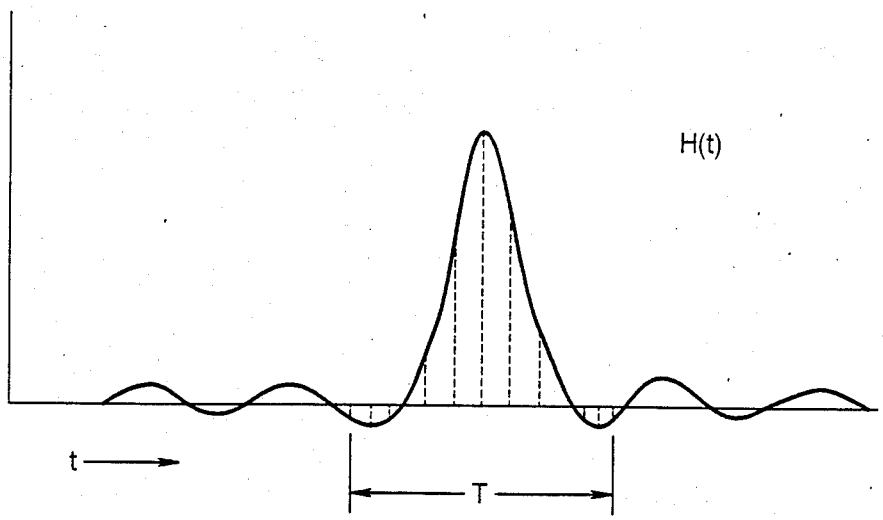
FIGS. 3A and 3B are schematics of a Fourier transformation for an ideal bandpass digital signal for the temporal domain to the frequency domain.
Figure 3A:
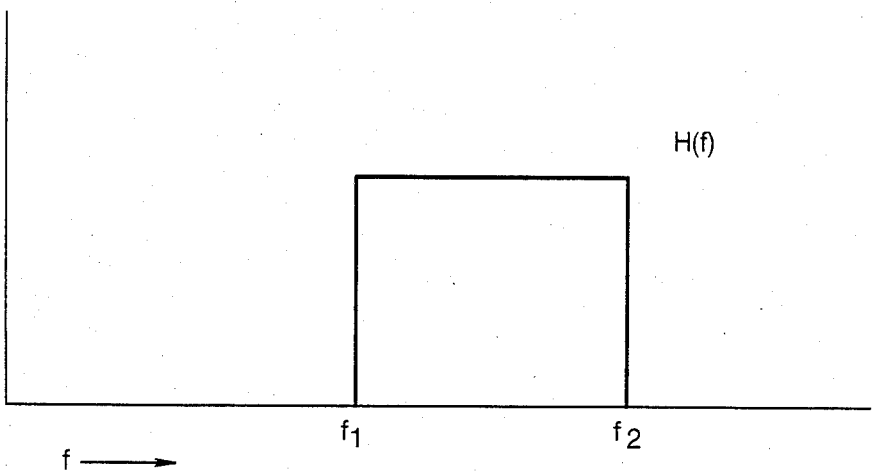

FIG. 3A represents the amplitude spectrum H(f) of an ideal bandpass filter in the frequency domain, while FIG. 3B represents the impulse response H(t) of such idealized bandpass filter in the temporal domain. In this example of an ideal bandpass filter, the time response is infinite for both positive and negative values of time.

For this reason, an ideal banddpass filter is said to be physically unrealizable. Of necessity, the time duration of a physically realizable bandpass filter must be finite, although it may be made arbitrarily long to closely approximate the desired ideal characteristic. The requirement that the temporal response of a physically realizable bandpass filter must be finite results in the appearance of ripples in the realizable filter passband, non-instantaneous transition from passband to stopband, and non-zero amplitude in the stopband (typically containing ripples or sidelobes).

In the particular case of digital filters, filter coefficients H(0), H(1), ... H(N−1) are obtained from within the time window T of the time domain impulse response such that a convolution of the filter coefficients H(0), H(1),··· , H(N−1) and the digital input signal X(n) in the time domain is a multiplication of the filter amplitude spectrum H(f) and the amplitude spectrum of the digital input signal X(n) in the frequency domain. Those skilled in the art recognize that one of the major tasks in filter synthesis is the selection of the filter coefficients H(0), H(1), ... , H(N−1) such that the frequency domains of the ideal filter are closely approximated by a realizable filter within the allowable constraints of coefficient number, coefficient size, operating speed, and operating power, while keeping the ripple effects of a realizable filter from adversely affecting the spectral characteristics of the output.

FIG. 3A represents the bandpass frequencies for an "ideal" filter in the frequency domain while FIG. 3B represents the impulse response of such idealized filter in the temporal domain. In this example of an ideal filter, H(t) does not go to zero meaning the truncated portions of H(t) fold back into the time region T. The result is aliasing in the temporal domain caused by undersampling the filter function in the frequency domain. This result is analogous to the aliasing in the frequency domain caused by undersampling in the temporal domain t. Discrete values for the filter coefficients $H_0$, $H_1$ ... $H_{N-1}$ can be obtained within the time window T such that a multiplication of the filter coefficients $H_0$, $H_1$, ... $H_{N-1}$ with the input digital signal X(n) is a convolution in the time domain and a multiplication in the frequency domain.

In particular, the filter coefficients $H_0$, $H_1$ ... $H_{N-1}$ are employed to convolve the input time series digital signal X(n). By choosing the bandpass frequencies $f_1$ and $f_2$, as seen in FIG. 3A, the filter coefficients $H_0$, $H_1$ ... $H_{N-1}$ can be obtained so as to exclude certain frequencies. Thus, the FIR filter F can effectively and accurately be adapted to pass a plurality of selected frequency domains through a multiplication of the filter coefficient $H_0$, $H_1$ ... $H_{N-1}$ and the input digital signal X(n). Moreover, since the filter coefficients $H_0$, $H_1$, ... $H_{N-1}$ are symmetrical, the FIR filter F has linear phase response.

Heretofore a drawback to the utilization of the FIR filter F has been the large number of delay registers Z and the large number of multiplications N of the filter coefficients $H_0$, $H_1$, ... , $H_{N-1}$ with the time series input digital signal X(n) required to implement such a filter. In battery powered portable seismic data acquisition units, the FIR filter F of the configuration as shown in FIG. 2 translates into a large circuit board area having high power consumption.

Figure 4:
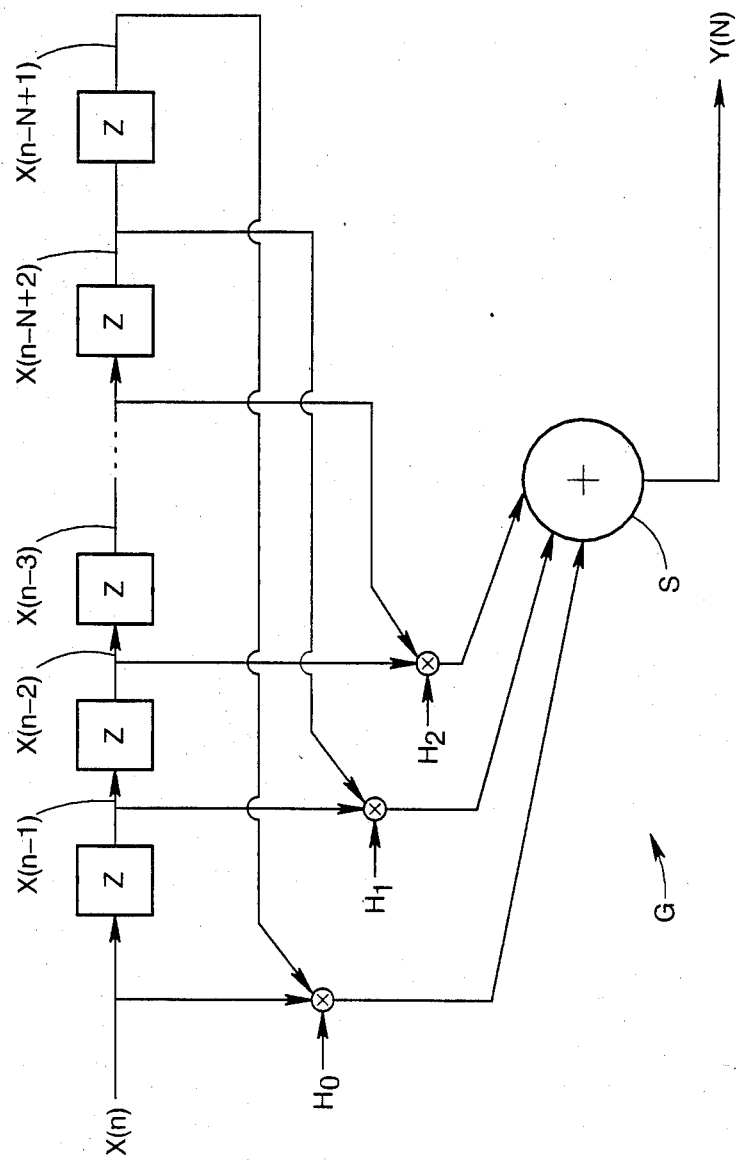
FIG. 4 is a schematic representation of the preferred canonical form of a FIR filter of the present invention.

In order to overcome these generally negative aspects of the FIR filter F configuration in FIG. 2 yet retain the desirable functions of FIR filters in general, a preferred canonical form of a FIR filter G is shown in FIG. 4 as embodied in the adaptive seismic signal processor A of the present invention. Since multiplication is generally more burdensome than addition, a first objective is to reduce the number of multiplication steps required in the FIR filter F. Since it is desired that the FIR filter G have a linear phase response, advantage can be made of the symmetry of the filter coefficients $H_0$, $H_1$, ... , $H_{N-1}$ about the filter midpoint to reduce the number of multiplications. As such, the FIR filter G of FIG. 4, although it has the identical number of delay registers Z as FIR filter F of FIG. 2, the number of multiplications by the filter coefficients $H_0$, $H_1$, ... , $H_{N-1}$ has been reduced (since in general H(i)=H(N−1−i) for i=n, n−1, n−2 ... n−N/2) by first summing the input signals X(n) and X(n−(N−1)) before multiplication by the filter coefficients.

As is known to those skilled in the art, summation of the individual outputs of each multiplication must occur in pairs rather than in the conceptual summation of all inputs in a single summation unit S. However, the general canonical form of the FIR filters F and G are understood to employ such technique without limitation.

Figure 5:
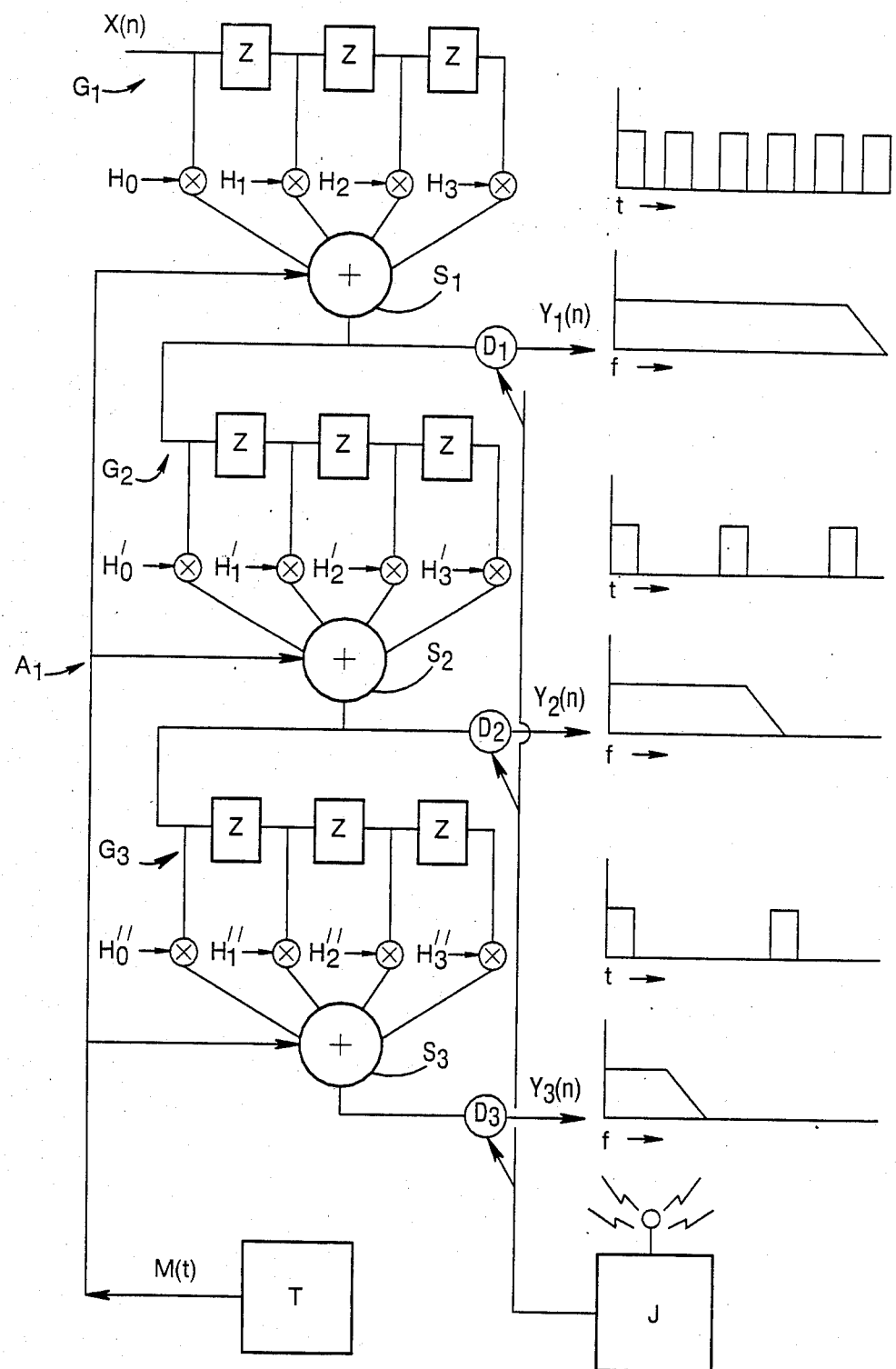
FIG. 5 is a schematic representation of a first embodiment of the adaptive seismic signal processor of the present invention, as well as the frequency domains and sampling rates available at each stage of the adaptive filtering.

Having described the functional parameters of FIR filters in general, FIG. 5 is a schematic of a first embodiment of the adaptive seismic signal processor $A_1$ employing the general canonical form of the FIR filter. Specifically, three FIR filters, G1, G2 and G3 are connected in cascade whereby the output digital signals Y1(n), Y2(n), and Y3(n) of FIR filters G1, G2, and G3 can either be directly outputted or passed as an input digital signal to FIR filters G2 and G3, respectively. It is understood that the number of FIR filters G used can be varied to produce any number of output digital signals Y(n), each having a predetermined frequency domain as shall be further discussed.

The adaptive seismic signal processor $A_1$ of FIG. 5 thus receives an input digital signal X(n). The input digtal signal X(n) is preferably at least an 8 kSamples/sec characterization of the original input analog signal K(t), i.e., the input analog signal K(t) is sampled at least once every 0.125 milliseconds. This oversampling of the input analog signal K(t) provides a sufficiently high rate of initial sampling such that a plurality of useful resample rates can be employed and simultaneously such high sampling rates simplify the analog anti-alias filter design.

As the input digital signal X(n) proceeds simultaneously through the delay registers Z of each filter unit G, it is multiplied by a predetermined set of filter coefficients $H_0$, $H_1$, ... , $H_{N-1}$. Such filter coefficients $H_0$, $H_1$, ... , $H_{N-1}$ represent a Fourier convolution in the temporal domain or multiplication in the frequency domain. In particular, the filter coefficients $H_0$, $H_1$ ... $H_{N-1}$ can be specified for FIR filter $G_1$ to produce a frequency bandpass of 0 to 800 Hz. The filter coefficients $H_0'$, $H_1'$ ... $H_{N-1}'$ can be specified for FIR filter $G_2$ to produce a frequency bandpass of 0 to 400 Hz. The filter coefficients $H_0''$, $H_1''$ ... $H_{N-1}''$ can be specified for FIR filter $G_3$ to produce a frequency bandpass of 0 to 200 Hz. It has been determined that the preferred number N of such coefficients is 64 for this application, although it is understood that other values of N can be selected consistent with specific operating requirements. Since the delay registers Z can be a memory address, the filter coefficients $H_0$, $H_1$, ... , $H_{N-1}$ can be located in a programmable read only memory (PROM) such that the frequency domain of any FIR filter G can be changed without making a hardware change to the adaptive seismic signal processor $A_1$ of the present invention by merely reprogramming the PROM.

A timing unit T having well known components for accurately generating a signal with a given periodicity communicates a resampling command M(t) according to such periodicity to the respective summation devices S of each FIR filter G. As such, timing unit T decimates the filtered digital signal X(n). In the first embodiment of the seismic signal processor $A_1$, the resampling command M(t) from the timing unit T resamples the output of each filter unit G at a resample rate one-half of the input signal sample rate. As such, output resampling rates of 4, 2 and 1 msec are provided by the adaptive seismic signal processor A. Other resampling rates can be provided for the timing unit T. The resampling command M(T) is also synchronized with the initial sampling rate produced by the analog to digital converter 18.

A selector unit J of the adaptive seismic signal processor receives a resample rate selection command from the field control unit C. The selection command is a coded signal which causes the selector unit J to select one of the sets of resampled output digital signals $Y_1(n)$, $Y_2(n)$ or $Y_3(n)$. Since all three output digital signals $Y_1(n)$, $Y_2(n)$ and $Y_3(n)$ are available concurrently, selector unit J by a coded signal can selectively energize a switch device $D_1$, $D_2$ or $D_3$ which selects a resampled output signal Y(n) having the desired resampling rate without loss or distortion thereof.

In order to preclude the generation of alias frequencies because of resampling, it is necessary that the highest frequency $F_c$ in the frequency domain passed by each FIR filter G does not exceed the Nyquist frequency $F_c$ for a given resampling rate, i.e., $SR=1/F_c 2$ where SR is the resampling rate in seconds and $F_c$ is Nyquist frequency in Hz. The filter coefficients $H_0$, $H_1$ ... $H_{N-1}$ must therefore be properly selected so as not to pass frequencies higher than the Nyquist frequency $F_c$ for a given resample rate. Anticipating such result, the filter coefficients selected for FIR filters $G_1$ to $G_3$ have a Nyquist frequency $F_c$ cutoff corresponding to the 1 msec, 2 msec and 4 msec resampling rates. The consequence of the preferred decimation is to produce digital output signals $Y_1(n)$, $Y_2(n)$ and $Y_3(n)$ each having a frequency content an octave lower than the preceding output digital signal.

Now looking again at FIG. 5, the series of FIR filters $G_1$-$G_3$, having the general canonical form shown in FIG. 2, are connected in cascade in the adaptive seismic signal processor $A_1$ of the present invention. The various output digital signals $Y_1(n)$, $Y_2(n)$ and $Y_3(n)$ each have a predetermined frequency domain an octave lower than the preceding input signal, i.e., 800 Hz, 400 Hz and 200 Hz, respectively. Since bandpass filtering is not ideal even with digital filters, each respective output digital signal Y(n) contains frequencies up to 1000 Hz, 500 Hz and 250 Hz, of decreasing amplitude. Since the FIR filter G averages the input digital signals X(n) over time, the output digital signal Y(n) will have a higher signal-to-noise ratio.

The adaptive filtration system $A_1$ having FIR filter units G connected in cascade thus provides concurrently for multiple output digital signals Y(n) of varying frequency content and resampling rate. By coding the field control unit C command signal to the selection unit J, only the output of a particular filter unit G is obtained. Selection between the various frequency domains and resampling rates can thus occur during the acquisition of the digital input signal X(n) without loss or deterioration thereof. Referring to FIG. 1, it is thus shown that a command signal can be transmitted from the remote field control unit C to the data acquisition unit 10 and the adaptive seismic signal processor system $A_1$ such that the various frequency domains and resample rates can be remotely selected.

Figure 6:
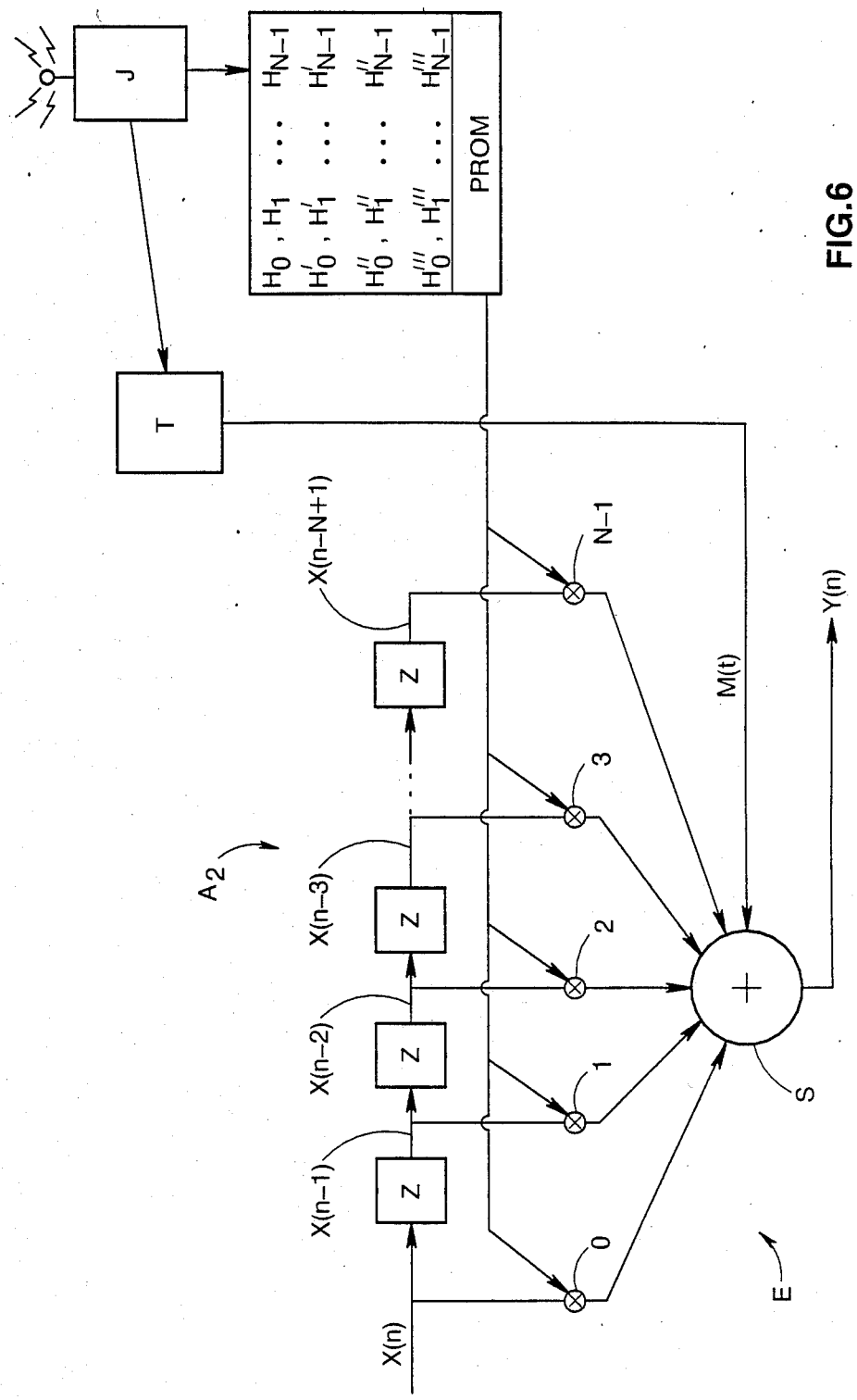
FIG. 6 is a second embodiment of the adaptive seismic signal processor of the present invention.

A second embodiment of the adaptive seismic signal processor $A_2$ is shown in FIG. 6. A single FIR filter E of the general canonical form receives the input digital signal X(n). To reduce the power consumption and processing time, the multiplicity of FIR filters G employed in FIG. 5 have been replaced by a single FIR filter E. Since the filter coefficients $H_0$, $H_1$ ... $H_{N-1}$ can be conveniently stored in PROM, and rather than having a multiplicity of FIR filters G which in addition to occupying valuable circuit board area, consume additional power a single FIR filter E can be employed by selecting from the sets of filter coefficients $H_0$, $H_1$ ... $H_{N-1}$ in PROM the ones associated with the desired resampling rate to preclude the generation of alias frequencies.

Operatively in the adaptive seismic signal processor $A_2$, selector unit J receives the command signal from the remote control unit C designating the desired resampling rate. The selector unit J causes the timing unit T to develop a periodic resampling signal M(t) synchronous with sampling command of the analog to digital converter 18 and coincident with the desired resampling rate. The resampling signal M(t) causes the summing unit S to be activated in accordance with such periodicity and thus produce an output digital signal Y(n). Concurrently, selector unit J addresses the set of filter coefficients $H_0$, $H_1$ ... $H_{N-1}$ cooperatively coupled to such resampling rate so as to preclude the generation of alias frequencies to the appropriate coefficient multipliers X (i.e., X=0, 1, ... N−1).

Changes may be made in the combination and arrangement of elements as heretofore set forth in the specification and shown in the drawings; it being understood that changes may be made in the embodiments disclosed without departing from the spirit of the invention defined in the following claims.

We claim:

1. An adaptive seismic signal processor with a portable seismic data acquisition unit for providing a plurality of sampling rates for recording digitized seismic signals in the portable seismic data acquisition unit, comprising:

processor means with the seismic data acquisition unit for sampling digitized seismic signals at a plurality of sampling rates and for passing cooperatively coupled frequency domains of the sampled digitized seismic signal so as to preclude the generation of alias frequencies, wherein pass band frequency domains are determined from a set of digital filter coefficients;

programmable memory means with the seismic data acquisition unit for storing a plurality of sets of filter coefficients for determining pass band frequency domains; and selector means with the seismic data acquisition unit responsive to command signals from a remote location for selecting one of the plurality of sampling rates and for addressing one of the sets of filter coefficients in the programmable memory means to the processor means whereby the processor means samples and passes a cooperatively coupled pass band frequency domain of the digitized seismic signal.

2. The apparatus of claim 1 wherein said processor means includes:
at least two digital filters connected in cascade.

3. The apparatus of claim 2 wherein each successive digital filter has a predetermined frequency domain an octave step lower than the preceding digital filter.

4. The apparatus of claim 2 wherein said digital filters are finite impulse response filters.

5. A method for providing a portable seismic data acquisition unit with a plurality of sampling rates for recording digitized seismic data therein, comprising the steps of:
transmitting a command signal to the portable seismic data acquisition unit from a remote location selecting a sampling rate from a plurality of sampling rates available in the seismic data acquisition unit for recording digitized seismic data therein and for selecting sets of digital filter coefficients from a plurality of digital filtering coefficients stored in programmable memory with the portable seismic data acquisition unit for passing frequency domains of input seismic signals cooperatively coupled to the selected sampling rate so as to preclude the generation of alias frequencies;
responsive to the command signal, digitally filtering input seismic signals with the selected sets of digital filter coefficients for passing frequency domains of the input steismic signal cooperatively coupled to the selected sampling rate so as to preclude the generation of alias frequencies;
responsive to the command signal, sampling the digitally filtered seismic signal at the selected sampling rate; and
recording the sampled seismic signal at the portable seismic data acquisition unit.

6. The method of claim 5 wherein frequency domain is cooperatively coupled to one of the plurality of resampling rates according to:

$$SR = 1/F_c 2$$

where SR is the resampling rate in samples/second and $F_c$ is the highest frequency content in each predetermined frequency domain in Hz.

7. An adaptive seismic signal processor with portable seismic data acquisition units including:
at least two digital filters connected in cascade, each digital filter being adapted to bandpass a predetermined frequency domain of an input digital seismic signal;
timing means for resampling the filtered digital seismic signal of each digital filter so as to provide a plurality of resampling rates;
programmable memory means for storing a plurality of sets of filter coefficients for use with the digital filters, whereby each set of filter coefficients provides a predetermined pass band frequency domain cooperatively with the resample rates so as to preclude the generation of alias frequencies; and
selector means responsive to a command signal from a remote location for selecting one of the resampling rates of the timing means during the course of acquiring the input digital seismic signal and for addressing sets of the filter coefficients to the digital filters whereby the pass band frequency domain of each digital filter is cooperatively coupled with the resampling rates of the timing means so as to preclude the generation of alias frequencies.

8. An adaptive seismic signal processor with a portable seismic data acquisition unit for providing a plurality of sampling rates for recording digitized seismic signals in the portable seismic data acquisition unit, comprising:
digitizing means with the portable seismic data acquisition unit for digitizing input seismic signals;
decimation means with the portable seismic data acquisition unit for sampling the digitized seismic signals at a plurality of sampling rates;
filtration means with the portable seismic data acquisition unit for passing a plurality of frequency pass bands cooperatively coupled to the sampling rates of said decimation means so as to preclude generation of alias frequencies in the sampled digitized seismic signals, wherein each frequency pass band is determined by a set of filter coefficients;
programmable memory means with the portable seismic data acquisition unit for storing sets of filter coefficients for use with said filtration means in generating frequency pass bands cooperatively coupled to the sampling rates; and
selector means with the portable seismic data acquisition unit responsive to transmitted coded signals for selecting sampling rates for said decimation means and for selecting sets of filter coefficients for said filtration means, wherein the selected set of filter coefficients have frequency pass bands cooperatively coupled to the selected sampling rates so as to preclude generation of alias frequencies.

9. A method for providing a portable seismic data acquisition unit with a plurality of sampling rates for recording digitized seismic data therein, comprising the steps of:
transmitting a command signal to the portable seismic data acquisition unit from a remote location selecting a sampling rate from a plurality of sample rates available with the portable seismic data acquisition unit for recording digitized seismic data therein;
responsive to the command signal, selecting a set of filter coefficients from a plurality of sets of filter coefficients stored in programmable memory of the portable seismic data acquisition unit; and
addressing the selected sets of filter coefficients to digital filters with the portable seismic data acquisition unit, wherein the digital filters band pass frequency domains of the seismic data cooperatively coupled to the selected sample rate so as to preclude generation of alias frequencies.

* * * * *

UNITED STATES PATENT OFFICE
CERTIFICATE OF CORRECTION

PATENT NO. : 4,692,909
DATED : September 8, 1987
INVENTOR(S) : Michael F. Gard, et al.

It is certified that error appears in the above-identified patent and that said Letters Patent are hereby corrected as shown below:

Column 3, line 55, "fruther" should read --further--.

Column 4, lines 64-65, "reprducibility" should read --reproducibility--.

Column 5, line 51, "the" first occurrence, should read --and--.

Column 6, line 27, "finite" should read --infinite--.

Claim 5, Column 11, line 31, "steismic" should read --seismic--.

Signed and Sealed this

Fifth Day of July, 1988

Attest:

DONALD J. QUIGG

*Attesting Officer*  *Commissioner of Patents and Trademarks*